Patented Feb. 18, 1941

2,232,099

UNITED STATES PATENT OFFICE 2,232,099

PROCESS OF DECOMPOSING CALCIUM SULPHATE

Fredrik W. de Jahn, New York, N. Y., assignor to Alan N. Mann, Scarsdale, N. Y.

No Drawing. Application September 22, 1939, Serial No. 296,039. In France and Denmark April 13, 1938

9 Claims. (Cl. 23—177)

Gypsum appears in nature and also is produced as a by-product of many chemical processes. For many years, the recovery of sulphur from this product has been attempted, but no entirely satisfactory process for doing this has been developed. Two processes are used to a limited extent. In one of them the gypsum is heated with alumina and silica, producing cement and $SO_2$; but this process is commercial only if carried out on an enormous scale and its use is very limited. Actually it is common knowledge in the trade that this process is in use in one plant in England and that one plant has been built in Germany and one in France for carrying on this process, but these plants have not been used extensively. Processes have also been suggested for recovering sulphur from gypsum by reacting it with ammonia.

Among the vast number of attempts to obtain a direct reduction of gypsum to $SO_2$ and lime, one can find that many different proportions of gypsum and a reducing agent (usually carbon) have been employed and that many different atmospheres have been suggested, but none of these processes has been successful. I believe that the reason is that the proper combination of atmosphere and proportion of ingredients has never heretofore been discovered. Because of the many failures high authorities have stated that this problem probably never could be solved.

I have now finally solved this problem on a simple commercial basis by discovering the correct conditions under which the reaction will progress, which means that conditions must be found under which the reaction will go on to substantial completion but without undesired side reactions taking place, leading to sintering or melting of the gypsum or decomposition of the resulting $SO_2$ gas.

The first requirement for successful operation of the process is the proportion of carbon to gypsum, and this must be followed within very close limits. Substantially the reduction seems to progress in accordance with the following reaction:

$$5CaSO_4 + 3C = 5CaO + 5SO_2 + 2CO_2 + CO$$

Heretofore, it has usually been stated that excess carbon should be employed, but I have found that the proportions indicated by this reaction must be followed very closely and the employment of excess carbon must be definitely avoided. Specifically, I have found that really good results can best be obtained if the carbon is so proportioned that there is available for the reaction between about 2.85 and 3.25 molecules of carbon for each 5 molecules of $CaSO_4$; or expressed in other form, for each molecule of $CaSO_4$ there preferably should be present between about .57 and about .65 molecule of carbon.

As one departs from the correct percentage, the value of the process depreciates rapidly. If excess carbon is present, there will be an undue formation of sulphides which will cause a loss of $SO_2$ gas and a great depreciation in the value of the resultant lime. On the lower side, failure to use sufficient carbon results in an incomplete reaction and this means a loss of sulphur which roughly speaking is proportionate to the deficiency in carbon, and again causes an impure lime residue. The necessity for accuracy in proportioning the carbon to the sulphur can be appreciated when one realizes that if .62 molecule of carbon is the correct proportion for each molecule of $CaSO_4$, a reduction in carbon to .56 will cause a loss of about 10% of the sulphur and leave a residue of lime containing something more than 10% of unconverted sulphate. If temperatures are unduly raised in an effort to increase the reduction, fusion may result and the entire operation will be ruined.

The figures given above apply for a reasonably pure gypsum heated to a temperature of between about 1050° and 1300° C. Impurities in the gypsum, such as silica and alumina, appear to change these figures slightly and apparently somewhat less carbon is necessary when they are present, but these substances should be avoided as they tend to injure the value of the lime produced. It is also possible that higher temperatures may demand somewhat less carbon than where the temperatures are at the bottom of the permissible range, but in any event, temperatures causing sintering or melting must be avoided. Broadly speaking, I have found that for all conditions the carbon mixed with the gypsum and actually available for the reaction must fall within the range of between .55 and .7 molecule of carbon for each molecule of $CaSO_4$ to get the full benefits of my process. If the initial atmosphere is somewhat more oxidizing than that hereafter specified, it may be possible that some of the carbon will be burned out of the charge. Such carbon would not be considered as actually available for the reaction.

As regards the atmosphere of reaction, this process ordinarily will be carried out in a rotary kiln fired with gas, oil or powdered coal. The actual reduction will best take place if this atmosphere is neutral or even slightly on the reducing side. However, the use of this type of atmosphere will not give satisfactory results, for I have found that where a neutral or reducing atmosphere is employed, the CO gas generated as a necessary incident to the first reaction, will react with the SO₂ gas and decompose this gas to products such as COS and elemental sulphur. This is highly disadvantageous as these products tend to precipitate and interfere with the reaction and also may react with water vapor present to form hydrogen sulphide.

I have discovered that these difficulties can be overcome by having present in the atmosphere sufficient oxygen so that while the atmosphere is substantially neutral there will be present a very small amount of free oxygen to combine with the CO generated and thereby protect the SO₂ gas. On this basis the entire reaction, including both the proportions of carbon and gypsum and the nature of the atmosphere, can be indicated by the formula:

$$10CaSO_4 + 6C + O_2 \rightarrow 10CaO + 10SO_2 + 6CO_2$$

As regards the permissible limits of free oxygen in the reaction atmosphere, a small excess of oxygen is permitted. However, I have found that if the oxygen content is allowed to rise unduly the progress of the reaction is upset and the process rendered substantially valueless. This undue excess of oxygen is ordinarily indicated by a tendency of the reaction charge to fuse or sinter and stick to the furnace lining, to the point where the furnace clogs. Some sticking in the hottest zone may occur even under correct conditions, but if the mass tends to build up unduly so that it cannot be readily freed, a slight reduction in the oxygen excess will usually restore the correct conditions. Ordinarily, good results are had if the oxygen is maintained so that the exit gases contain less than one-half of 1% of oxygen but it is understood that this figure is given only by way of a guide for the truly critical factor is that the mass must not sinter or fuse sufficiently to stick to the lining of the furnace to the point where clogging results. I intend to include the possibility of having this small amount of oxygen present in the term "substantially neutral atmosphere."

In carrying out my process in a rotary kiln, the simplest method of operation is to so proportion the air to the fuel that all the carbon of the fuel will be burned to CO₂ and just enough air will remain to combine with the CO generated from the carbon mixed with the gypsum. However, if desired, the flame may be so adjusted that definitely non-oxidizing conditions are maintained at the point where the solid charge reaches its maximum temperature and where the reaction is completed, and further along in the kiln where a substantial reaction has taken place but the temperature is somewhat lower and the charge is being subjected to the action of the previously evolved gases, additional air may be employed to complete combustion and to insure all of the carbon being converted to CO₂.

My process may readily be understood from the following illustrative example:

Natural gypsum was heated to a temperature of about 125° C. to drive off all free water and some of the water of crystallization. The product was finely ground and analyzed carefully to ascertain the exact percentage of CaSO₄ in the material. With this was incorporated a sufficient proportion of high quality coke to supply just .6 molecule of carbon for each molecule of CaSO₄ and the two were intimately mixed in a ball mill. The usual type of rotary kiln such as is employed in burning cement was heated to a temperature averaging about 1170° in the combustion zone. The air was carefully adjusted to give a very slight excess of oxygen over that necessary fully to burn the fuel to CO₂. The mixture of gypsum and coke was passed through the furnace and as the gases evolved, the exit gases were carefully checked as a basis for maintaining the slight excess of oxygen desired.

On this basis, it is possible to get an atmosphere having an SO₂ content of about 14%, but if the oxygen content is dropped so that the flame is strictly neutral or reducing, the SO₂ concentration drops very rapidly and in some cases drops to as low as one-half the maximum figure. On the other hand, if the oxygen content is increased to the point where the flame is definitely oxidizing, usually indicated by oxygen content rising to the order of about 1% or higher in the effluent gases, the charge tends to sinter and clog the furnace.

When the operation was conducted under correct conditions about 98% of the theoretical yield of sulphur was obtained as SO₂ gas in a form and concentration readily adapted for use in a usual type of sulphuric acid contact apparatus. The residue was a lime substantially free from sulphides and containing only a very small percentage of undecomposed sulphate. This lime slaked readily and was available for usual commercial purposes.

When a high grade anhydrite is used as the raw material, even better results may be obtained and the process is somewhat more economical to operate. The process may also be employed as a means to obtain values from by-product calcium sulphate, which almost always is in the hydrated state. Broadly speaking, all of these products may be referred to as gypsum.

My researches indicate that this same reaction can be employed for the treatment of the sulphates of the other alkaline earths (barium and strontium) provided that a somewhat higher temperature is employed—say in the order of about 1400° C. or even higher.

This application is a continuation in part of my earlier application Serial No. 137,009, filed April 15, 1937.

What I claim is:

1. The process of decomposing calcium sulphate into calcium oxide and oxides of sulphur consisting in heating calcium sulphate with carbon in a substantially neutral atmosphere using a percentage of carbon substantially within the range of between .55 and .7 molecule of carbon for each molecule of CaSO₄.

2. A process as specified in claim 1, in which the molecular ratio of carbon to calcium sulphate is between about .57 and .65 molecule of carbon for each molecule of CaSO₄ and the atmosphere is slightly on the oxidizing side but is such as to contain not over about ½ of 1% of oxygen in the effluent gases.

3. A process of obtaining sulphur dioxide from gypsum which comprises heating gypsum with carbon in a substantially neutral atmosphere to a temperature above 1050° C. while maintaining the ratio of gypsum to carbon such that there is present between about .55 and .7 mol of carbon for each mol of calcium sulphate.

4. The process of decomposing calcium sulphate into calcium oxide and oxides of sulphur, which consists in preparing an intimate mixture of finely divided calcium sulphate with finely divided carbon substantially in a ratio to have present between .55 and .7 molecule of carbon for each molecule of calcium sulphate and heating the same in a rotary kiln in an atmosphere which ranges between substantially neutral and very slightly oxidizing to a temperature substantially between 1050° C. and 1300° C. until the reaction has been substantially completed and until at least approximately 90% of the sulphur in the calcium sulphate has been converted into oxides of sulphur.

5. A process of reducing calcium sulphate which comprises heating a mixture of calcium sulphate and carbon in a rotary kiln in such proportions and in such an atmosphere that the reaction takes place substantially in accordance with the following reaction:

$$10CaSO_4 + 6C + O_2 = 10CaO + 10SO_2 + 6CO_2$$

6. A process of decomposing an alkaline earth sulphate which comprises heating such sulphate in a substantially neutral atmosphere with carbon in an amount so that there is between about .55 and .7 molecule of carbon present for each molecule of such sulphate.

7. The process of decomposing calcium sulphate into calcium oxide and sulphur dioxide, which comprises thoroughly mixing calcium sulphate with coke in proportion to have present approximately six-tenths of a molecule of carbon for each molecule of $CaSO_4$, heating such mixture in a direct fired rotary kiln while maintaining the combustion conditions such that an approximately neutral flame is obtained and introducing into the mixed combustion and reaction gases within the kiln, at a point removed from the point of initial combustion, additional oxygen sufficient to convert the CO generated in the reaction into $CO_2$.

8. A process as specified in claim 7, in which the combustion flame is adjusted slightly on the reducing side and sufficient oxygen is later introduced to provide a slight excess of oxygen in the effluent gases.

9. The process of decomposing calcium sulphate into calcium oxide and oxides of sulphur, which consists in preparing an intimate mixture of finely divided calcium sulphate with finely divided carbon substantially in a ratio to have present between .55 and .7 molecule of carbon for each molecule of calcium sulphate and heating the same in a direct fired rotary kiln while adjusting the flame so that the charge reaches a maximum temperature in excess of 1050° C. and decomposition is completed under approximately neutral and non-oxidizing conditions, and further along in the kiln introducing additional air so that the gases are further reacted to insure the combustion of substantially all of the carbon to $CO_2$.

FREDRIK W. DE JAHN.